(12) United States Patent
Fernando et al.

(10) Patent No.: US 10,727,888 B2
(45) Date of Patent: Jul. 28, 2020

(54) PROXIMITY DETECTION BASED ON AN ELECTROMAGNETIC FIELD PERTURBATION

(71) Applicant: Qualcomm Incorporated, San Diego, CA (US)

(72) Inventors: Udara Fernando, San Diego, CA (US); Roberto Rimini, San Diego, CA (US); Mustafa Emin Sahin, San Diego, CA (US); Seunghwan Kim, San Diego, CA (US); Nikhil Anand Muthya, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/939,222

(22) Filed: Mar. 28, 2018

(65) Prior Publication Data

US 2019/0044561 A1    Feb. 7, 2019

Related U.S. Application Data

(60) Provisional application No. 62/541,629, filed on Aug. 4, 2017.

(51) Int. Cl.
*H04B 17/12* (2015.01)
*H04W 52/24* (2009.01)
(Continued)

(52) U.S. Cl.
CPC ............ *H04B 1/3838* (2013.01); *G01S 13/08* (2013.01); *G01S 13/76* (2013.01); *G01S 13/878* (2013.01); *H04B 17/12* (2015.01);
*H04W 52/242* (2013.01); *H04W 52/283* (2013.01); *H01Q 1/245* (2013.01); *H01Q 21/062* (2013.01);
(Continued)

(58) Field of Classification Search
CPC combination set(s) only.
See application file for complete search history.

(56) References Cited

U.S. PATENT DOCUMENTS 8,214,003 B2    7/2012  Wong et al.
8,798,695 B1    8/2014  Zheng et al.
(Continued)

OTHER PUBLICATIONS

International Search Report and Written Opinion—PCT/US2019/016920—ISA/EPO—dated Apr. 15, 2019.
(Continued)

*Primary Examiner* — Ganiyu A Hanidu
(74) *Attorney, Agent, or Firm* — Holland & Hart LLP/Qualcomm

(57) ABSTRACT

An apparatus is disclosed for proximity detection based on an electromagnetic field perturbation. In an example aspect, the apparatus includes an antenna array including at least two feed ports and a wireless transceiver coupled to the antenna array. The wireless transceiver is configured to generate an electromagnetic field via the antenna array. The wireless transceiver is also configured to receive energy from the electromagnetic field via the at least two feed ports. The wireless transceiver is additionally configured to adjust a transmission parameter based on the energy received via the at least two feed ports. The transmission parameter varies based on a range to an object that is present within the electromagnetic field.

30 Claims, 10 Drawing Sheets

(51) Int. Cl.

| | | |
|---|---|---|
| *H04W 52/28* | (2009.01) | |
| *G01S 13/08* | (2006.01) | |
| *G01S 13/87* | (2006.01) | |
| *G01S 13/76* | (2006.01) | |
| *H04B 1/3827* | (2015.01) | |
| *H01Q 21/06* | (2006.01) | |
| *H04L 27/12* | (2006.01) | |
| *H01Q 1/24* | (2006.01) | |
| *H04L 27/26* | (2006.01) | |
| *H04L 5/00* | (2006.01) | |
| *H04B 7/06* | (2006.01) | |

(52) U.S. Cl.
CPC ......... *H01Q 21/065* (2013.01); *H04B 7/0617* (2013.01); *H04L 5/0023* (2013.01); *H04L 27/12* (2013.01); *H04L 27/2601* (2013.01); *H04L 27/2626* (2013.01)

(56) References Cited

U.S. PATENT DOCUMENTS

| | | | |
|---|---|---|---|
| 9,578,159 B2 | 2/2017 | Muthukumar et al. | |
| 2007/0176827 A1* | 8/2007 | Itoh | H01Q 13/206 |
| | | | 343/700 MS |
| 2013/0172045 A1 | 7/2013 | Caballero et al. | |
| 2013/0273974 A1* | 10/2013 | Lea | H01Q 21/24 |
| | | | 455/562.1 |
| 2013/0278477 A1* | 10/2013 | Dupuy | H01Q 1/50 |
| | | | 343/852 |
| 2014/0071008 A1 | 3/2014 | Desclos et al. | |
| 2016/0141757 A1* | 5/2016 | Lai | H01Q 19/005 |
| | | | 343/770 |
| 2016/0178730 A1 | 6/2016 | Trotta et al. | |
| 2017/0353338 A1 | 12/2017 | Amadjikpe et al. | |
| 2017/0356980 A1* | 12/2017 | Islam | G01S 5/02 |
| 2019/0020110 A1* | 1/2019 | Paulotto | H01Q 5/20 |

OTHER PUBLICATIONS

Khaliel M., et al., "A Novel Design Approach for Co/Cross-Polarizing Chipless RFID Tags of High Coding Capacity", IEEE Journal of Radio Frequency Identification, vol. 1, No. 2, Jun. 2017, pp. 135-143.

Perret E., "Displacement Sensor Based on Radar Cross-Polarization Measurements", IEEE Transactions on Microwave Theory and Techniques, vol. 65, No. 3, Mar. 2017, pp. 955-966.

* cited by examiner

1000

```
┌─────────────────────────────────────────────┐
│ Generate an electromagnetic field via at least one antenna │
│                      1002                      │
└─────────────────────────────────────────────┘
                      │
                      ▼
┌─────────────────────────────────────────────┐
│ Receive energy from the electromagnetic field via │
│   at least two feed ports, the at least two feed  │
│   ports associated with one or more other antennas │
│                      1004                      │
└─────────────────────────────────────────────┘
                      │
                      ▼
┌─────────────────────────────────────────────┐
│  Adjust a transmission parameter based on the  │
│  energy received via the at least two feed ports, the │
│  transmission parameter varying based on a range to an │
│  object that is present within the electromagnetic field │
│                      1006                      │
└─────────────────────────────────────────────┘
```

FIG. 10

PROXIMITY DETECTION BASED ON AN ELECTROMAGNETIC FIELD PERTURBATION

CROSS-REFERENCE TO RELATED APPLICATION(S)

This application claims the benefit of U.S. Provisional Application No. 62/541,629, filed 4 Aug. 2017, the disclosure of which is hereby incorporated by reference in its entirety herein.

TECHNICAL FIELD

This disclosure relates generally to wireless communication and, more specifically, to using multiple antenna feed ports to determine a proximity of an object perturbing an electromagnetic field.

BACKGROUND

Cellular and other wireless networks may utilize high frequencies and small wavelengths to provide high data rates. In particular, fifth generation (5G)-capable devices communicate using frequencies at or near the extremely-high frequency (EHF) spectrum with wavelengths at or near millimeter wavelengths. Although higher-frequency signals provide larger bandwidths to efficiently communicate large amounts of data, these signals suffer from higher path loss (e.g., path attenuation). To compensate for the higher path loss, transmit power levels can be increased or beamforming can concentrate energy in a particular direction.

Accordingly, the Federal Communications Commission (FCC) has determined a maximum permitted exposure (MPE) limit. To meet targeted guidelines, devices are responsible for balancing performance with transmission power and other constraints. This balancing act can be challenging to achieve, especially with devices that have cost, size, and other constraints.

SUMMARY

An apparatus is disclosed that implements proximity detection based on an electromagnetic field perturbation. The described techniques sense a disturbance in an electromagnetic field to determine whether an object is proximate to a computing device. An electromagnetic field perturbation that is caused by the object can be detected by analyzing at least two portions of the electromagnetic field that are sensed via at least two antenna feed ports and a wireless transceiver. A range (e.g., distance) to the object can be determined based on the perturbation. Responsive to proximity detection, a transmission parameter can be adjusted for wireless communication to enable the wireless transceiver to meet guidelines promulgated by the government or the wireless industry. The described techniques for proximity detection can utilize existing transceiver hardware without introducing additional sensors.

In an example aspect, an apparatus is disclosed. The apparatus includes an antenna array including at least two feed ports and a wireless transceiver coupled to the antenna array. The wireless transceiver is configured to generate an electromagnetic field via the antenna array. The wireless transceiver is also configured to receive energy from the electromagnetic field via the at least two feed ports. The wireless transceiver is additionally configured to adjust a transmission parameter based on the energy received via the at least two feed ports. The transmission parameter varies based on a range to an object that is present within the electromagnetic field.

In an example aspect, an apparatus is disclosed. The apparatus includes an antenna array including at least two feed ports and transmission means for generating an electromagnetic field via the antenna array. The apparatus also includes reception means for receiving energy from the electromagnetic field via the at least two feed ports. The apparatus additionally includes adjustment means for adjusting a transmission parameter based on the energy received via the at least two feed ports. The transmission parameter varies based on a range to an object that is present within the electromagnetic field.

In an example aspect, a method for proximity detection based on an electromagnetic field perturbation is disclosed. The method includes generating an electromagnetic field via at least one antenna. The method also includes receiving energy from the electromagnetic field via at least two feed ports, with the at least two feed ports associated with one or more other antennas. The method additionally includes adjusting a transmission parameter based on the energy received via the at least two feed ports. The transmission parameter varies based on a range to an object that is present within the electromagnetic field.

BRIEF DESCRIPTION OF DRAWINGS

FIG. 10 is a flow diagram illustrating an example process for proximity detection based on an electromagnetic field perturbation.

DETAILED DESCRIPTION

Figure 1:
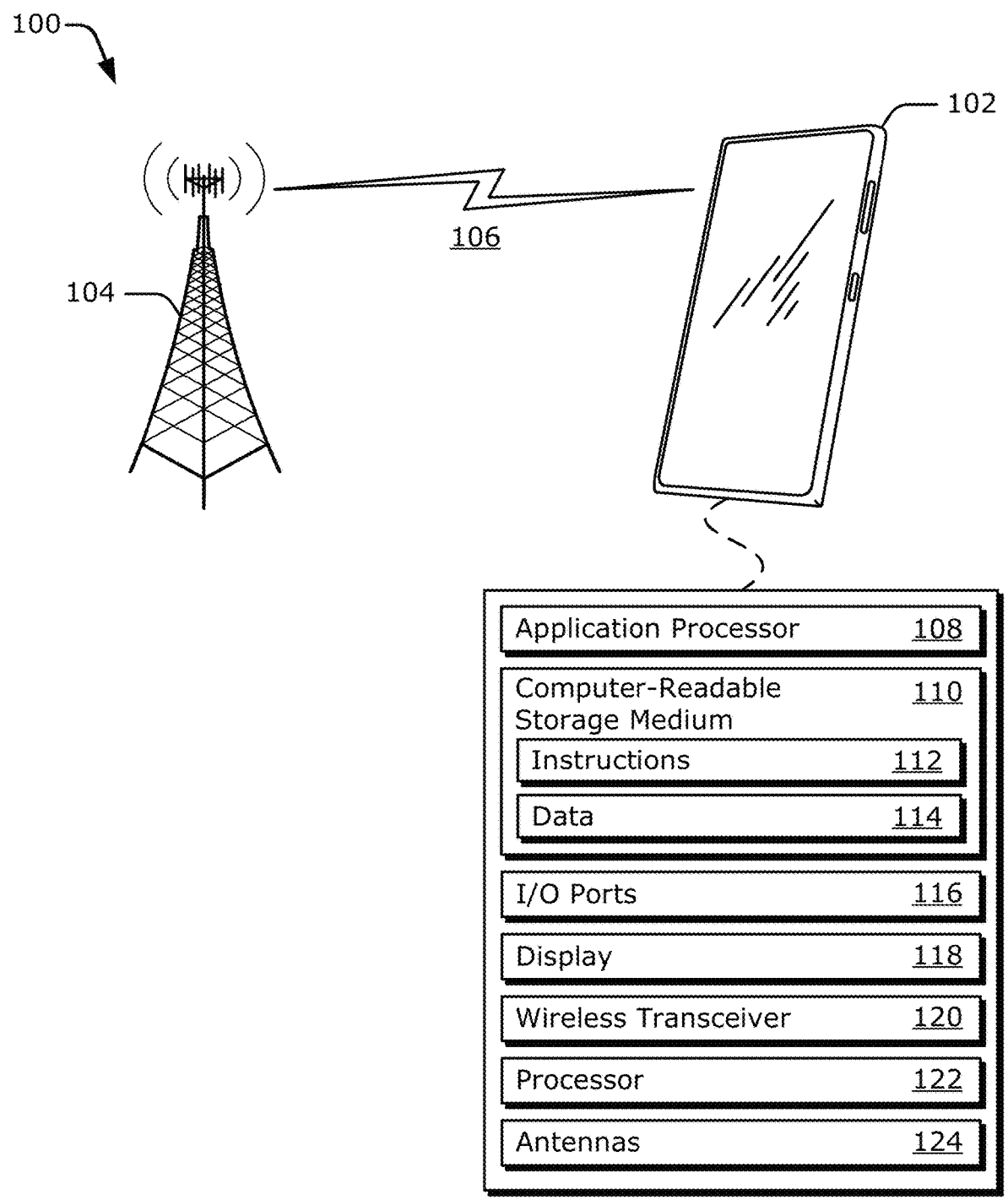
FIG. 1 illustrates an example computing device for proximity detection based on an electromagnetic field perturbation.

An electronic device may use a high transmit power to compensate for path loss associated with millimeter wave (mmW) signals. Many of these electronic devices can be physically operated by a user. Such physical proximity presents opportunities for radiation to exceed given guidelines, such as a maximum permitted exposure (MPE) limit as determined by the Federal Communications Commission (FCC). Because of these issues, it is advantageous to enable devices to detect a proximity of the user.

Some proximity-detection techniques may use a dedicated sensor to detect the user, such as a camera, an infrared sensor, or a radar sensor. However, these sensors may be bulky and expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increases a cost and size of the electronic device.

In contrast, techniques for proximity detection based on electromagnetic field perturbations are described herein. The described techniques sense a disturbance in an electromagnetic field to determine whether an object is proximate to a computing device. An electromagnetic field perturbation is determined by analyzing at least two portions of the electromagnetic field that are sensed via at least two antenna feed ports and a wireless transceiver. For example, the portions may be with respect to different locations, phases, polarizations, or angular directions of the electromagnetic field. Different antenna elements may be used to sense the portions, including a dipole antenna, a patch antenna, or a bowtie antenna. In some implementations, a perturbation metric is computed using the at least two portions. Based on a magnitude or a phase of the perturbation metric, the object can be detected. A range (e.g., distance or slant range) to the object can also be determined based on the perturbation metric. Responsive to proximity detection, a transmission parameter can be adjusted for wireless communication to enable the wireless transceiver to meet safety guidelines promulgated by the government or the wireless industry. The described techniques for proximity detection offer a relatively inexpensive approach that can utilize existing transceiver hardware without introducing additional sensors.

In some implementations, the wireless transceiver may be utilized in stand-alone proximity-detection applications. For example, the wireless transceiver can be implemented as an automotive bumper sensor to assist with parking or autonomous driving. As another example, the wireless transceiver can be installed on a drone to provide collision avoidance. In other implementations, the wireless transceiver can selectively perform proximity detection or wireless communication. In such cases, this enables dual-use of components within the transmit and receive chains, which decreases cost and size of the wireless transceiver. Based on the proximity detection, and as described herein, transmission parameters can be adjusted for wireless communication to enable the wireless transceiver to meet safety guidelines promulgated by the government or the wireless industry, such as a Maximum Permitted Exposure (MPE) limit as determined by the Federal Communications Commission (FCC).

FIG. 1 illustrates an example computing device 102 for proximity detection based on an electromagnetic field perturbation. In an example environment 100, the computing device 102 communicates with a base station 104 through a wireless communication link 106 (wireless link 106). In this example, the computing device 102 is implemented as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, server, network-attached storage (NAS) device, smart appliance or other internet of things (IoT) device, medical device, vehicle-based communication system, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, cable television head-end, terrestrial television broadcast tower, access point, peer-to-peer device, mesh network node, small cell node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as 3rd Generation Partnership Project Long-Term Evolution (3GPP LTE), 5th Generation (5G), IEEE 802.11, IEEE 802.16, Bluetooth™, and so forth. In some implementations, instead of or in addition to providing a data link, the wireless link 106 may wirelessly provide power and the base station 104 may comprise a power source.

The computing device 102 includes an application processor 108 and a computer-readable storage medium 110 (CRM 110). The application processor 108 may include any type of processor (e.g., an application processor, a digital signal processor (DSP), or a multi-core processor), that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to respective networks and other electronic devices connected therewith. Additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless LAN (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith.

The wireless transceiver 120 includes circuitry and logic for transmitting and receiving signals via antennas 124. Components of the wireless transceiver 120 can include amplifiers, mixers, switches, analog-to-digital converters, filters, and so forth for conditioning signals. The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains).

The computing device 102 also includes a processor 122, which is coupled to the wireless transceiver 120. The processor 122 can be implemented within or separate from the wireless transceiver 120. Although not explicitly shown, the processor 122 can include a portion of the CRM 110 or can access the CRM 110 to obtain computer-readable instructions. The processor 122, which can be implemented as a modem, controls the wireless transceiver 120 and enables wireless communication or proximity detection to be performed. The processor 122 can include baseband circuitry to perform high-rate sampling processes that can include analog-to-digital conversion, digital-to-analog conversion, Fourier transforms, gain correction, skew correction, frequency translation, and so forth. The processor 122 can provide communication data to the wireless transceiver 120 for transmission. The processor 122 can also process a baseband version of a signal obtained from the wireless transceiver 120 to generate data, which can be provided to other parts of the computing device 102 via a communication interface for wireless communication or proximity detection.

Figure 2:
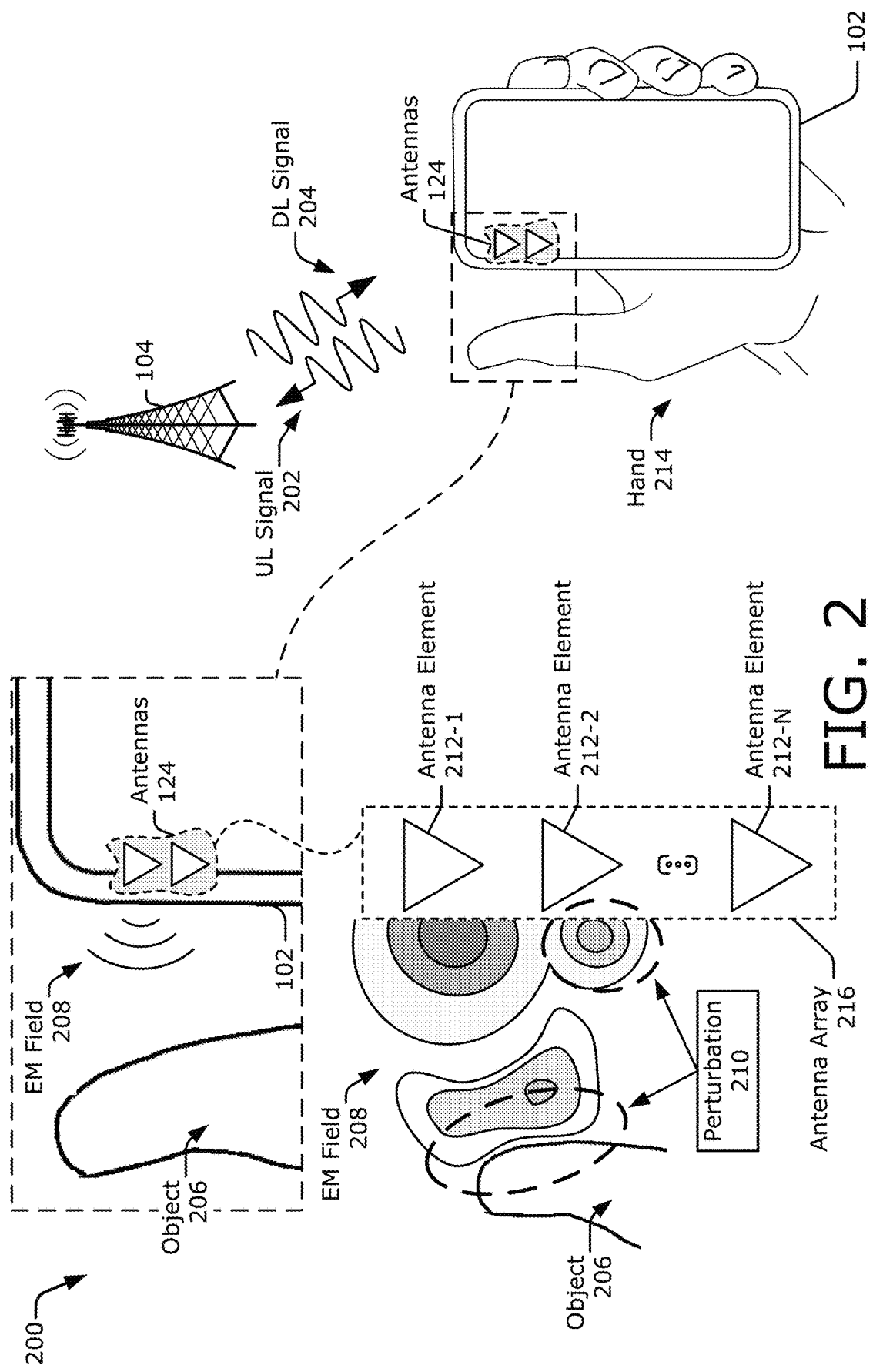
FIG. 2 illustrates an example operating environment for proximity detection based on an electromagnetic field perturbation.

FIG. 2 illustrates an example operating environment 200 for proximity detection based on an electromagnetic field perturbation. In the example environment 200, a hand 214 of a user holds the computing device 102. In one aspect, the computing device 102 communicates with the base station 104 by transmitting an uplink signal 202 (UL signal 202) or receiving a downlink signal 204 (DL signal 204) via the antennas 124. A user's thumb, however, may represent a proximate object 206 that may be exposed to radiation via the uplink signal 202.

To detect whether the object 206 exists or is within a detectable range, the computing device 102 generates an electromagnetic (EM) field 208 via at least one of the antennas 124. The electromagnetic field 208 can be generated by transmitting a predetermined proximity detection signal or the uplink signal 202. In some cases, the proximity detection signal may be generated such that it includes a single frequency or tone or multiple frequencies or tones. For example, the proximity detection signal can include an orthogonal frequency-division multiplexing (OFDM) signal having multiple sub-carriers of different frequencies. As another example, the proximity detection signal can include a frequency-modulated continuous wave (FMCW) signal (e.g., a linear frequency-modulated (LFM) continuous wave signal or chirp signal, a triangular frequency-modulated continuous wave signal, a sawtooth frequency-modulated continuous wave signal, and so forth). As yet another example, the proximity detection signal can include a continuous-wave signal having a relatively constant frequency.

In FIG. 2, a resulting amplitude of the electromagnetic field 208 is represented with different shades of grey, where darker shades represent higher amplitudes and lighter shades represent lower amplitudes. If the object 206 is proximate to another one of the antennas 124, interactions of the object 206 with the electromagnetic field 208 produce one or more perturbations (e.g., disturbances or changes) in the electromagnetic field 208, such as perturbation 210. The perturbation 210 represents a variation in a magnitude or phase of the electromagnetic field 208 due to the object 206 causing different constructive or destructive patterns to occur within the electromagnetic field 208.

In some implementations, the antennas 124 may comprise at least two different antennas, at least two antenna elements 212 of an antenna array 216, at least two antenna elements 212 associated with different antenna arrays 216, or any combination thereof. As shown in FIG. 2, the antennas 124 correspond to at least two of the antenna elements 212 within the antenna array 216. The antenna array 216 can include multiple antenna elements 212-1 to 212-N, where N represents a positive integer greater than one. In the depicted example, a first antenna element 212-1 emits the electromagnetic field 208 and the perturbation 210 is sensed via a second antenna element 212-2. The second antenna element 212-2 may be co-located with respect to the first antenna element 212-1 as part of the antenna array 216 or otherwise proximate to the first antenna element 212-1. In some cases, the second antenna element 212-2 is adjacent to the first antenna element 212-1 within a same antenna array 216 (e.g., there are no antenna elements 212 physically located between the first antenna element 212-1 and the second antenna element 212-2). A distance between the antenna elements 212 in the antenna array 216 can be based on frequencies that the wireless transceiver 120 emits. For example, the antenna elements 212 in the antenna array 216 can be spaced by approximately half a wavelength from each other (e.g., by approximately a centimeter (cm) apart for frequencies around 30 GHz).

A response of the second antenna element 212-2 to the electromagnetic field 208 is affected by the object 206 reflecting or absorbing the electromagnetic field 208 and also by any mutual coupling or interference produced by the first antenna element 212-1. In general, energy from the electromagnetic field 208 induces a current in the second antenna element 212-2, which is used to measure the perturbation 210 or the resulting electromagnetic field 208 that is disturbed by the object 206. By sensing the perturbation 210, a determination can be made as to whether the object 206 is present or outside a detectable range (e.g., not present). The detectable range may be within approximately 40 cm from the antennas 124, between 0 and 10 cm from the antennas 124, and so forth. In general, the detectable range can vary based on transmission power or sensitivity of the wireless transceiver 120. A duration for which the electromagnetic field 208 is generated can also be based on the detectable range. Example durations can range from approximately one microsecond to several tens of microseconds.

In some cases, the detectable range can include ranges that are not readily measured using radar-based techniques. For example, the radar-based techniques can be limited to ranges that are farther than a minimum range, which is proportional to a bandwidth of the FMCW signal. Example minimum ranges include 4 cm or 2 cm for a FMCW signal having a bandwidth of 4 GHz or 8 GHz, respectively. Therefore, to detect closer distances using radar-based techniques, the wireless transceiver 120 generates larger bandwidth signals at an expense of increased design complexity or increased cost of the wireless transceiver 120. Using the described techniques, however, the range to the object 206 can be measured at distances closer than these minimum ranges. In this way, the described techniques can be used to augment close-range detection even if radar-based techniques are used for far-range detection.

In some implementations, the wireless transceiver 120 can generate the electromagnetic field 208 via the first antenna element 212-1 during a same time that the second antenna element 212-2 is used to sense the electromagnetic field 208. The antennas 124 and/or elements thereof may be implemented using any type of antenna, including patch antennas, dipole antennas, bowtie antennas, or a combination thereof, as further described with respect to FIGS. 3 and 4.

Figure 3:
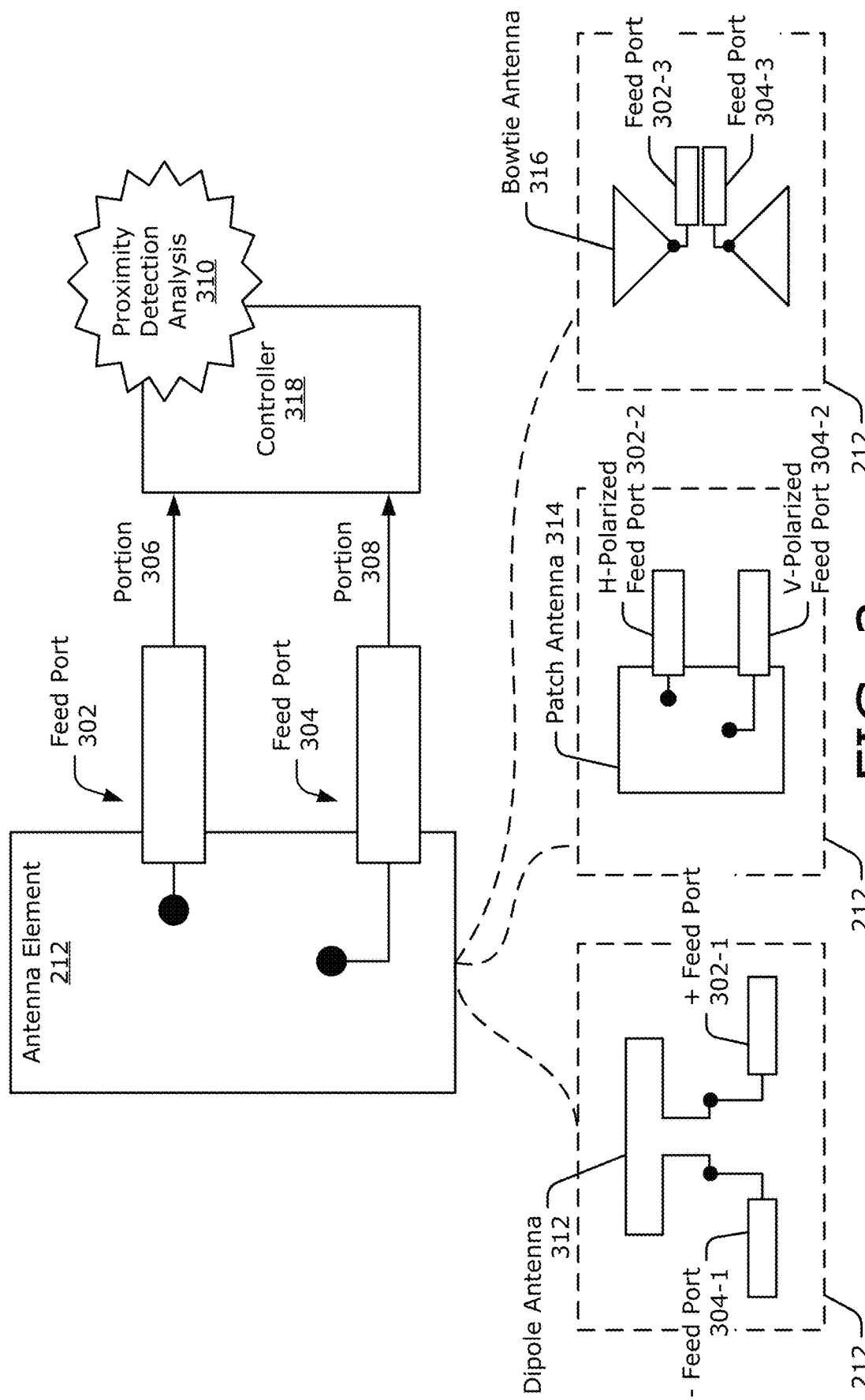
FIG. 3 illustrates multiple examples of an antenna element for proximity detection based on an electromagnetic field perturbation.

FIG. 3 illustrates an example antenna element 212 for proximity detection based on electromagnetic field perturbations and three example implementations thereof. In the depicted configuration (in the top half of FIG. 3), the antenna element 212 includes multiple feed ports, such as a first feed port 302 and a second feed port 304. The first and second feed ports 302 and 304 separate the response of the antenna element 212 to the electromagnetic field 208 into multiple portions, such as portions 306 and 308. The multiple portions may be with respect to different locations within the electromagnetic field 208, different phases of the electromagnetic field 208, different polarizations of the electromagnetic field 208, different angular directions of the electromagnetic field 208 (e.g., angles of arrival), and so forth.

These portions 306 and 308 are used for a proximity detection analysis 310. A controller 318 can perform the proximity detection analysis 310 and an adjustment to a transmission parameter. The proximity detection analysis 310, which is further described with respect to FIG. 6, detects the object 206 that disturbed the electromagnetic field 208 based on the portions 306 and 308. The controller 318 can include at least one processor and at least one CRM, such as the application processor 108 and the CRM 110 of FIG. 1. The CRM can store computer-executable instructions, such as the instructions 112 of FIG. 1. The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller 318 can be implemented as part of the wireless transceiver 120, the processor 122, a special-purpose processor configured to perform MPE techniques, a general-purpose processor, some combination thereof, and so forth.

Three example antenna elements 212 are also depicted in FIG. 3. For example, the antenna element 212 may be implemented using a dipole antenna 312, which includes a pair of differential feed ports (e.g., a positive (+) feed port 302-1 and a negative (−) feed port 304-1). In this case, the portions 306 and 308 are differential portions that are out-of-phase with respect to each other (e.g., differ by approximately 180 degrees). As another example, the antenna element 212 may be implemented using a patch antenna 314, which includes a horizontally-polarized feed port 302-2 and a vertically-polarized feed port 304-2. Using the patch antenna 314, the portions 306 and 308 have orthogonal polarities. In other words, the portions 306 and 308 respectively represent a horizontally-polarized portion and a vertically-polarized portion in this implementation. As yet another example, the antenna element 212 may be implemented using a bowtie antenna 316, which includes feed ports 302-3 and 304-3. In this case, the portions 306 and 308 represent different angular directions of the electromagnetic field 208 that are sensed along different angles of arrival.

Although the antenna element 212 is shown to include two feed ports 302 and 304, other implementations may generate the multiple portions from two different antenna elements 212 that each include at least one feed port. In general, any two feed ports may be used to produce the portions 306 and 308, which are in some way different from each other (e.g., are physically separate from each other or sense different phases, polarizations, or angles of arrivals). By using multiple feed ports, the described techniques for proximity detection can operate in the presence of self-generated interference without an extensive calibration process that characterizes the electromagnetic field 208 (e.g., without determining a transmit power associated with the electromagnetic field 208 or characterizing the mutual coupling between the transmitting and receiving antenna elements 212).

Figure 4:
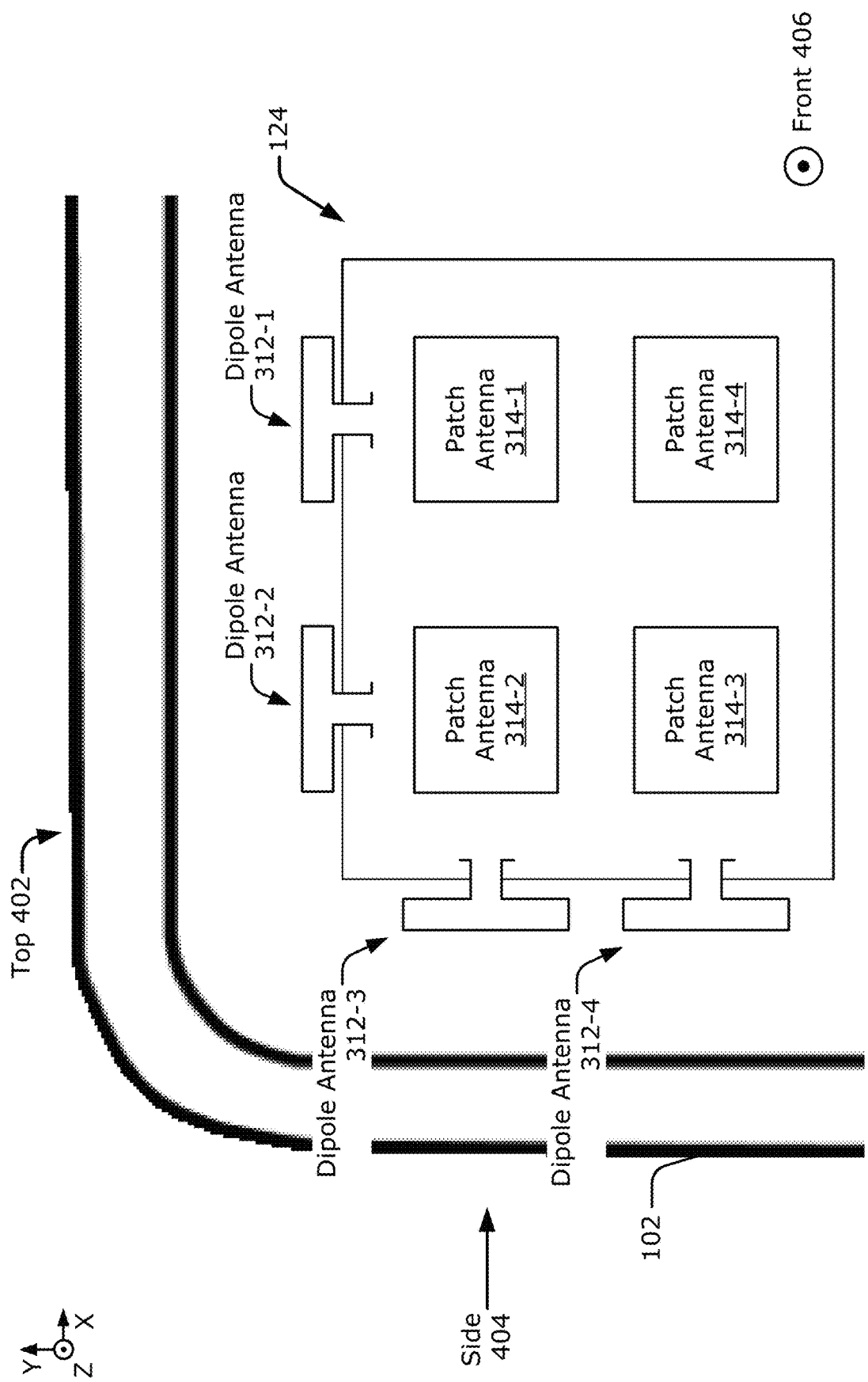
FIG. 4 illustrates an example antenna array for proximity detection based on an electromagnetic field perturbation.

FIG. 4 illustrates an example antenna array 216 for proximity detection based on an electromagnetic field perturbation. In the depicted configuration, the antenna array 216 is positioned in an upper-left corner of the computing device 102. To detect one or more objects 206 (of FIG. 2) that are positioned differently with respect to the computing device 102, the antenna array 216 includes a combination of four dipole antennas 312-1, 312-2, 312-3, and 312-4 and four patch antennas 314-1, 314-2, 314-3, and 314-4. The dipole antennas 312-1 and 312-2 can be used to detect an object 206 that is near a top 402 of the computing device 102 along a vertical direction or Y axis. Likewise, the dipole antennas 312-3 and 312-4 can detect another object 206 that is near a side 404 of the computing device 102 along a horizontal direction or X axis. The patch antennas can detect an additional object 206 that is in front 406 of the computing device 102 or above the page along a Z axis.

In some implementations, a given electromagnetic field 208 (of FIG. 2) may be sensed using a same antenna element 212 or different antenna elements 212. For example, the dipole antenna 312-2 can generate the electromagnetic field 208 and the dipole antennas 312-1 can sense any perturbations 210 in the electromagnetic field 208. The dipole antennas 312-1 can generate the portions 306 and 308 via the feed ports 302 and 304. As another example, the patch antenna 314-2 can generate the electromagnetic field 208 and the patch antennas 314-1 can generate the portions 306 and 308 via the feed ports 302 and 304.

In other implementations, a given electromagnetic field 208 (of FIG. 2) may be sensed using different antenna elements 212. For example, the dipole antenna 312-2 can generate the electromagnetic field 208 and the dipole antennas 312-1 and 312-3 can respectively generate one of the portions 306 or 308. Alternatively, both dipole antennas 312-1 and 312-3 can respectively generate both of the portions 306 and 308 via feed ports 302 and 304. As another example, the patch antenna 314-2 can generate the electromagnetic field 208 and the patch antennas 314-1 or 314-3 can generate one of the portions 306 or 308. Alternatively, both patch antennas 314-1 and 314-3 can respectively generate both of the portions 306 and 308.

Different types of antenna elements 212 can also be used to generate or sense the electromagnetic field 208. For example, the dipole antenna 312-2 can generate the electromagnetic field 208 and both the dipole antenna 312-3 and the patch antenna 314-2 can sense at least one of the portions of the electromagnetic field 208. In some cases, both the dipole antenna 312-3 and the patch antenna 314-2 can each sense multiple portions of the electromagnetic field 208. Although not explicitly depicted, multiple electromagnetic fields 208 may also be generated simultaneously. For example, the dipole antennas 312-1 or 312-2 can generate an electromagnetic field 208 towards the top 402 of the computing device 102 while the patch antennas 314-1, 314-2, 314-3, or 314-4 generate another electromagnetic field towards the front 406 of the computing device 102.

By utilizing different types of antenna elements 212 or by having the antennas 124 positioned at different locations within or around the computing device 102, multiple locations of the object 206 can be monitored using the described techniques. This further enables transmission parameters to be independently adjusted relative to which antenna element 212 detects the object 206. Such independent detection therefore enables two or more of the antenna elements 212 to be configured for different purposes, for example one of the antenna elements 212 can be configured for enhanced communication performance while another one of the antenna elements 212 is simultaneously configured to comply with FCC requirements. As described in further detail with respect to FIG. 5, some of the components of the wireless transceiver 120 can be utilized for both wireless communication and proximity detection.

Figure 5:
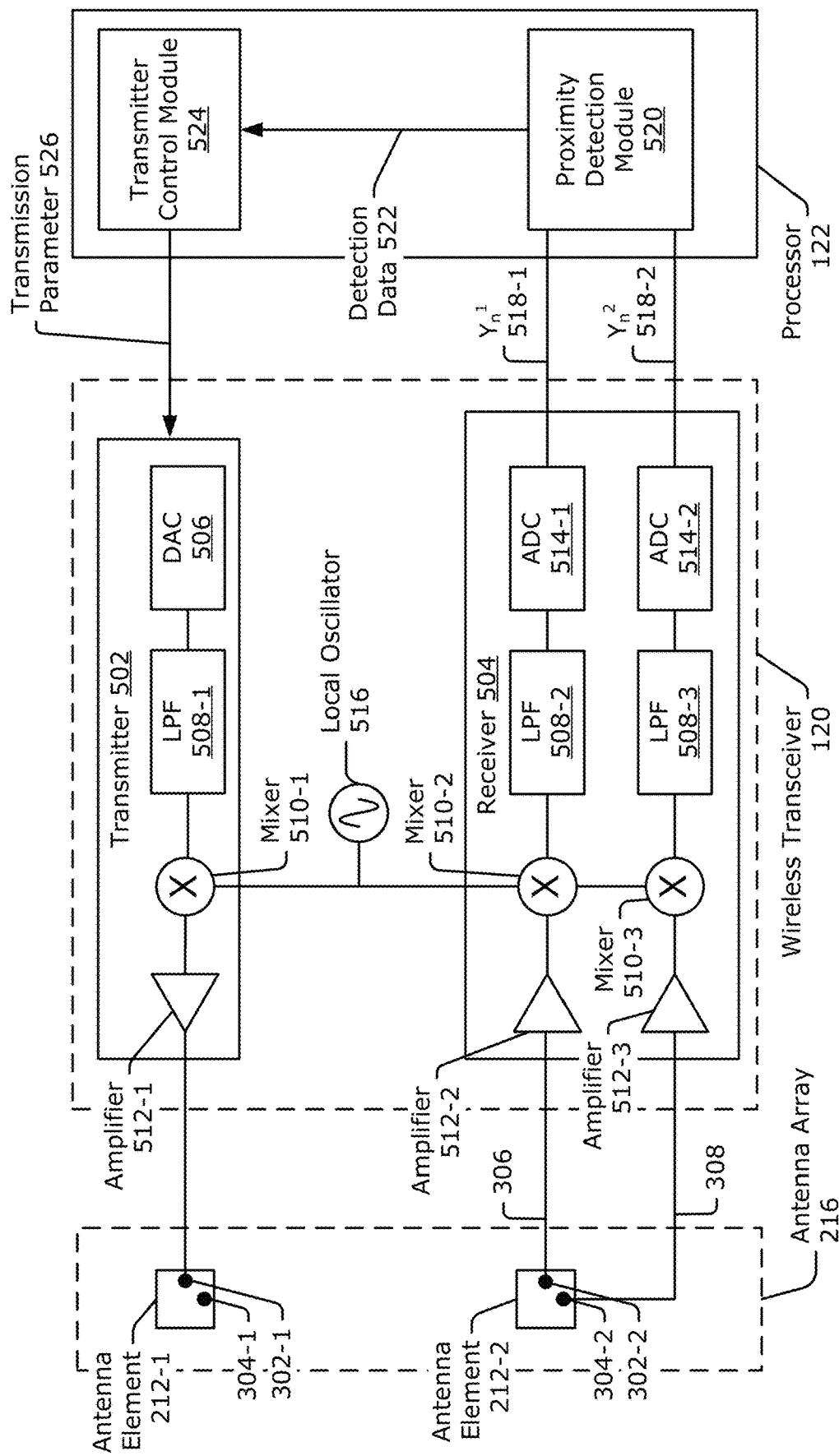
FIG. 5 illustrates an example wireless transceiver and processor for proximity detection based on an electromagnetic field perturbation.

FIG. 5 illustrates an example wireless transceiver 120 and processor 122 for proximity detection based on an electromagnetic field perturbation. The wireless transceiver 120 includes a transmitter 502 and a receiver 504, which are respectively coupled between the processor 122 and the antenna array 216. The transmitter 502 is shown to include a digital-to-analog converter (DAC) 506, a filter 508-1 (e.g., a low-pass filter (LPF)), a mixer 510-1, and an amplifier 512-1. Although not explicitly shown, the transmitter 502 can also include a signal generator that is coupled between the digital-to-analog converter 506 and the processor 122. The signal generator can generate the electromagnetic field 208, the proximity detection signal, or the uplink signal 202.

In the depicted configuration, the transmitter 502 is coupled to a first feed port 302-1 of the antenna element 212-1. The first feed port 302-1 can comprise, for example, one of the differential feed ports of the dipole antenna 312, one of the polarized feed ports of the patch antenna 314, or one of the directional feed ports of the bowtie antenna 316, as shown in FIG. 3. The antenna element 212-1 can also include a second feed port 304-2, which is not used in this example.

The receiver 504 is shown to include two parallel receive chains that are respectively coupled to another first feed port 302-2 and another second feed port 304-2 of the antenna element 212-2. Although a single antenna element 212 is shown to be coupled to the two receive chains, the two receive chains can alternatively be respectively coupled to two different antenna elements 212, such as the antenna element 212-2 and the antenna element 212-N or FIG. 2. Each receive chain respectively includes amplifiers 512-2 and 512-3 (e.g., a low-noise amplifier), mixers 510-2 and 510-3, filters 508-2 and 508-3 (e.g., LPFs), and analog-to-digital converters (ADC) 514-1 and 514-2. The wireless transceiver 120 also includes a local oscillator 516, which generates a reference signal enabling the mixers 510-1, 510-2, and 510-3 to upconvert or downconvert analog signals within the transmit or receive chains. In some implementations, the local oscillator 516 can include a frequency-modulated local oscillator to generate a frequency-modulated reference signal that is used to produce a FMCW signal via the mixer 510-1 and downconvert a received FMCW signal via the mixers 510-2 and 510-3. The transmitter 502 and the receiver 504 can also include other additional components that are not depicted in FIG. 5 such as band-pass filters, additional mixers, switches, and so forth.

Using these components, the transmitter 502 generates the electromagnetic field 208 via the antenna element 212-1, and the receiver 504 senses the electromagnetic field 208 via the antenna element 212-2. The response of the antenna element 212-2 to the electromagnetic field 208 is separated into the portions 306 and 308 via the feed ports 302-2 and 304-2. The receiver 504 generates digital signals $Y_n^1$ 518-1 and $Y_n^2$ 518-2, which can comprise digital baseband signal that are derived from the portions 306 and 308, respectively. The digital signals 518-1 and 518-2 may be represented by Equation 1 below, where the electromagnetic field 208 results from a transmitted proximity detection signal x(n).

$$Y_n^1 = \alpha_1 x(n) e^{j\varphi_1} + \text{noise}_1$$

$$Y_n^2 = \alpha_2 x(n) e^{j\varphi_2} + \text{noise}_2 \qquad \text{Equation 1}$$

where $\alpha_1$ and $\alpha_2$ are respective amplitudes and $\varphi_1$ and $\varphi_2$ are respective phases of the digital signals 518-1 and 518-2. The digital signals can be affected by any perturbations 210 caused by the object 206 or any mutual coupling that occurs between the first antenna element 212-1 and the second antenna element 212-2.

The processor 122 performs the proximity detection analysis 310 of FIG. 3 based on the digital signals 518-1 and 518-2. In FIG. 5, the processor 122 includes at least one proximity detection module 520 and at least one transmitter control module 524. The proximity detection module 520 obtains the digital signals 518-1 and 518-2 and generates detection data 522, which indicates whether or not the object 206 is detected. In some cases, the detection data 522 can also include a range to the object 206. Based on the detection data 522, the transmitter control module 524 generates at least one transmission parameter 526 that controls one or more transmission attributes for wireless communication. The transmission parameter 526 can specify one or more transmission-related aspects of the uplink signal 202, such as power level, polarization, frequency, duration, beam shape, beam steering angle, a selected antenna that transmits the uplink signal 202 (e.g., another antenna that is on a different surface of the computing device 102 and is not obstructed by the object 206), combinations thereof, and so forth. By specifying the transmission parameter 526, the processor 122 can, for example, cause the transmitter 502 to decrease power if an object 206 is close to the computing device 102 or increase power if the object 206 is at a farther range or is not detectable. The ability to detect the object 206 and control the transmitter 502 enables the processor 122 to balance the performance of the computing device 102 with compliance. In other implementations, the application processor 108 can perform one or more of these functions.

Although not explicitly shown, multiple antenna elements 212 can be used to sense additional portions of the electromagnetic field 208 (e.g., a third portion or a fourth portion) and provide multiple pairs of digital signals 518 to the processor 122 (e.g., a third digital signal 518 or a fourth digital signal 518). For example, two or more of the patch antennas 314 of FIG. 4 may be used to sense the electromagnetic field 208 that is generated via one of the other patch antennas 314. In this way, additional information is provided to the proximity detection module 520 to increase a probability of detecting the object 206 (or accurately determining a range thereof) and to decrease a probability of false alarms. The transmitter control module 524 can also make different adjustments in dependence on whether the object 206 is detected by both antenna elements 212 or by one of the antenna elements 212.

In some situations, the object 206 may be closer to one of the antenna elements 212, which enables one antenna element 212 to detect the object 206 while another antenna element 212 may be unable to detect the object 206. In this case, the transmitter control module 524 can decrease a transmit power of the one antenna element 212 relative to the other antenna element 212. In some implementations, the multiple antenna elements 212 can be used to further characterize the relationship between the object 206 and the antennas 124, such as by estimating an angle to the object 206. In this way, the transmitter control module 524 can adjust the transmission parameter 526 to steer the uplink signal 202 away from the object 206. Operations of the proximity detection module 520 are further described with respect to FIG. 6.

Figure 6:
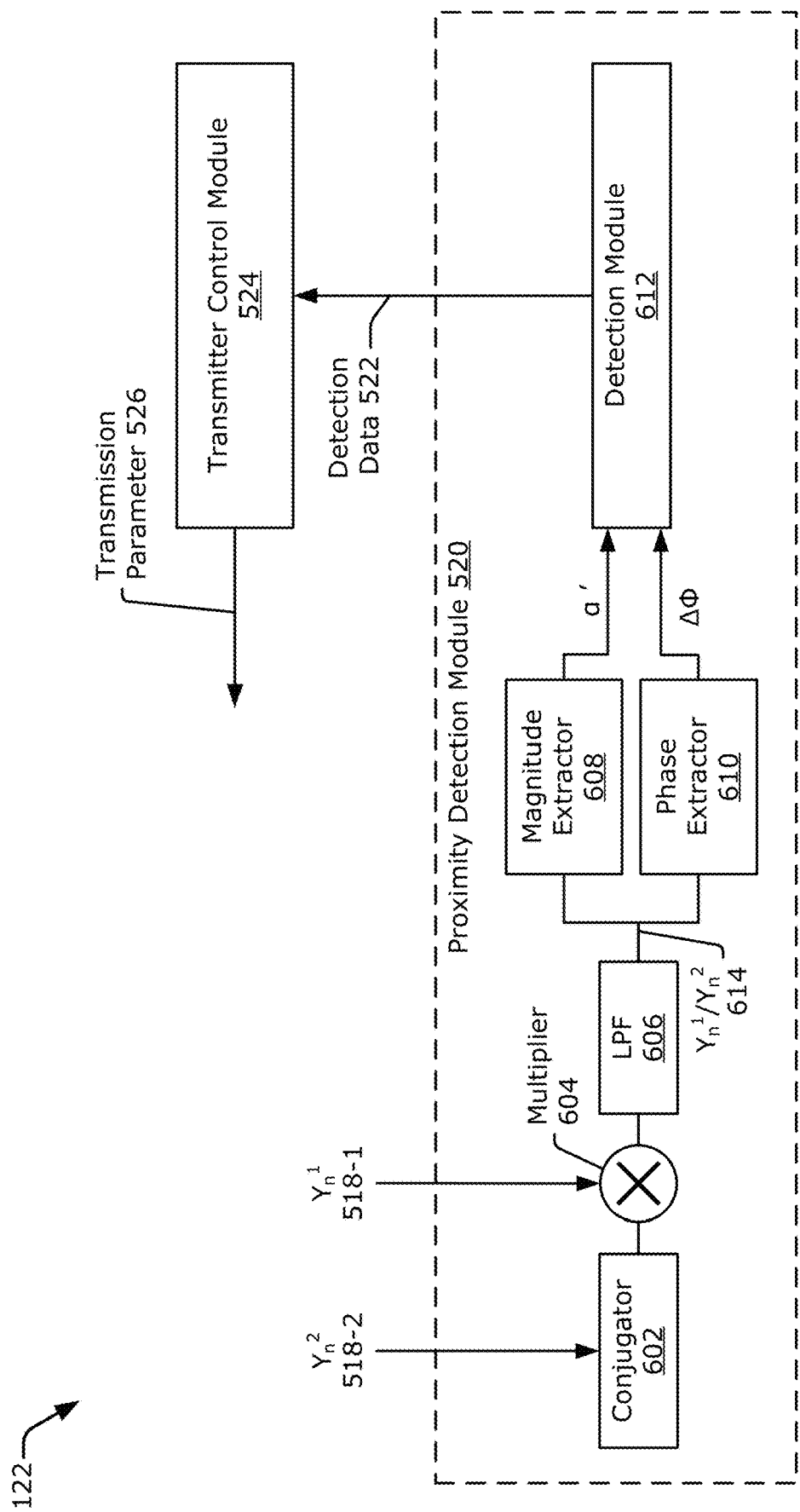
FIG. 6 illustrates an example scheme performed by a proximity detection module for proximity detection based on an electromagnetic field perturbation.

FIG. 6 illustrates an example scheme performed by the proximity detection module 520 for proximity detection based on an electromagnetic field perturbation. The proximity detection module 520 includes a conjugator 602, a multiplier 604, a low-pass filter (LPF) 606, a magnitude extractor 608, a phase extractor 610, and a detection module 612. The conjugator 602 performs a complex conjugate operation on one of the digital signals 518, which is the second digital signal 518-2 in this configuration. The two signals are then multiplied together via the multiplier 604. The low-pass filter 606 filters the resulting signal to generate a perturbation metric 614. The low-pass filter 606 may be implemented as an infinite-impulse response (IIR) filter and can remove any spurious frequency components within the resulting signal. The perturbation metric 614 may be described, at least in part, by Equation 2 below.

$$Y_n^1 Y_n^{2*} \cong \alpha_1 \alpha_2 |x(n)|^2 e^{j(\varphi_1 - \varphi_2)} = \alpha' e^{j\Delta\varphi} |x(n)|^2 \quad \text{Equation 2}$$

The perturbation metric 614 can include additional terms not shown in Equation 2 due to operations of the multiplier 604 or low-pass filter 606. Although the second digital signal 518-2 is shown to be conjugated, alternatively the first digital signal 518-1 may be conjugated. In another example implementation, one of the digital signals 518 can be divided by the second digital signal 518-2. The resulting perturbation metric 614 is described in Equation 3, below.

$$Y_n^1 / Y_n^2 \cong \alpha_1 / \alpha_2 e^{j(\varphi_1 - \varphi_2)} = \alpha' e^{j\Delta\varphi} \quad \text{Equation 3}$$

As shown by Equations 2 and 3, the perturbation metric 614 can comprise a complex number having an amplitude $\alpha'$ and a phase $\Delta\varphi$ that result from combining the digital signals 518-1 and 518-2 together. The magnitude extractor 608 and the phase extractor 610 respectively extract the amplitude and the phase of the perturbation metric 614. If more than two portions of the electromagnetic field 208 are sensed and more than two digital signals 518 are provided to the processor 122 (e.g., by using more than two antenna feed ports), the proximity detection module 520 can generate multiple perturbation metrics 614 based on different pairs of digital signals 518. The multiple antenna feed ports can be associated with a same antenna element 212 or with different antenna elements 212.

Based on the perturbation metric 614, the detection module 612 determines whether the object 206 is detected and generates the detection data 522. The detection data 522 can include a Boolean value indicating whether the object 206 is detected or is not detected. The detection data 522 can also include other information such as the range to the object 206 or which antenna elements 212 or antenna feed ports were used to detect the object 206. As described above, the transmitter control module 524 can use the detection data 522 to generate the transmission parameter 526. In some implementations, the components or functions of the processor 122 illustrated in FIG. 6 may be included in the application processor 108. In this case, the digital signals 518 are provided to the application processor 108. Operations of the detection module 612 are further described with respect to FIG. 7.

Figure 7:
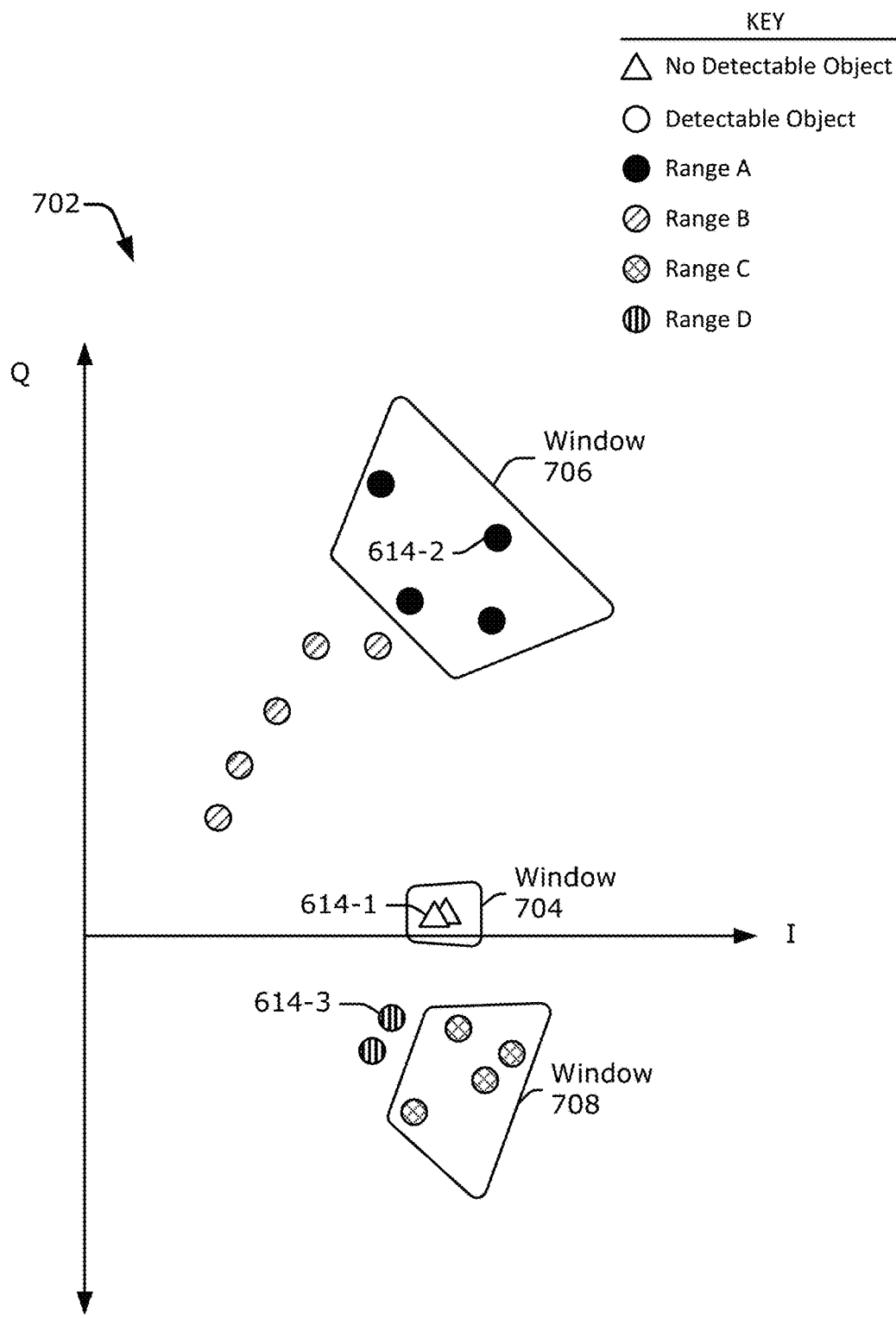
FIG. 7 illustrates example perturbation metrics for proximity detection based on an electromagnetic field perturbation.

FIG. 7 illustrates example perturbation metrics 614 for proximity detection based on an electromagnetic field perturbation. As described above, the perturbation metric 614 can include a complex number, which has an in-phase and quadrature component. The perturbation metric 614 is plotted using a triangle or a circle symbol in FIG. 7. With reference to the key in the top-right corner, the triangle indicates a perturbation metric 614 that corresponds to a time period for which the object 206 is not detectable (e.g., the object 206 is not present or is beyond a detectable range). In contrast, the circle indicates a perturbation metric 614 that corresponds to a time period for which the object 206 is detectable. Example ranges A, B, C, and D represent different distances to the object 206 in increasing order (e.g., range A represents smaller distances and range D represents farther distances). As an example, range A includes distances less than 1 cm, range B includes distances between 1 cm and 2 cm, range C includes distances between 2 cm and 3 cm, and range D includes distances between 3 cm and 5 cm.

A graph 702 plots in-phase and quadrature components of multiple perturbation metrics 614, including perturbation metrics 614-1, 614-2, and 614-3. If the object 206 is not detectable, the perturbation metric 614-1 occurs within a window 704, which represents a range of amplitudes or phases. In general, each perturbation metric 614 has a relatively similar amplitude and phase if the object 206 is not detectable. This is because any perturbations 210 caused by the object 206 generally do not affect or are not detectable by the antenna element 212. Therefore, the amplitude and phase of the perturbation metric 614 remains relatively consistent if no object is within a detectable range.

As the object 206 comes within a detectable range of the wireless transceiver 120, however, the in-phase and quadrature components of the multiple perturbation metrics 614 can vary significantly. The perturbation metrics 614-2 and 614-3 illustrate these variations. These variations occur because the electromagnetic perturbations 210 influence the magnitude or phase of the electromagnetic field 208 that is sensed by the antenna element 212. Windows 706 and 708 respectively show a range of magnitudes and phases associated with the object 206 being approximately within a range A or within a range C from the antennas 124. Although not explicitly shown, other windows can also be included to show the range of magnitudes and phases associated with the object 206 being approximately within a range B or within a range D from the antennas 124. In general, multiple perturbation metrics 614 exhibit larger variations (e.g., are more likely to be dis-similar) the closer the object 206 is to the antennas 124. Likewise, the multiple perturbation metrics 614 exhibit smaller variations (e.g., are more likely to be similar) the farther the object 206 is from the antennas 124.

Due to the different exhibited characteristics of the perturbation metric 614, the detection module 612 can use the perturbation metric 614 to detect the object 206 or determine the range to the object 206. In one implementation, the detection module 612 can make the determination based on whether the amplitude or phase of the perturbation metric 614 is within a predetermined (e.g., pre-defined) window or threshold. For example, if the perturbation metric 614 is within the window 704, the detection module 612 determines that the object 206 is not present or is outside the detectable range. Alternatively, if the amplitude or phase is outside the window 704, the detection module 612 can determine that the object 206 is proximate to the antennas 124. In some cases, multiple windows can be used to further determine the range to the object 206. For example, the detection module 612 can determine that the range corresponds to the range A or C if the perturbation metric 614 is within the window 706 or the window 708, respectively. By determining the range to the object 206, the transmitter control module 524 can adjust the transmission parameters 526 based on the range.

In another implementation, the detection module 612 can record previously-measured perturbation metrics 614 and analyze variations in later-measured perturbation metrics 614 to determine whether the object 206 is present or not. For example, if the perturbation metric 614-1 is previously-measured during a known time period for which the object 206 is not present, the detection module 612 can compare a later-measured perturbation metric 614, such as the perturbation metric 614-2 or 614-3, to determine if the object is present. If there is a large amount of variation, the detection module 612 can determine that the object 206 is present. In other cases, the detection module 612 can compare two perturbation metrics 614 that are collected using two different antenna elements 212. If the perturbation metrics 614 vary significantly with respect to each other, then the object 206 may be determined to be present with respect to one or both of the antenna elements 212.

Figure 8:
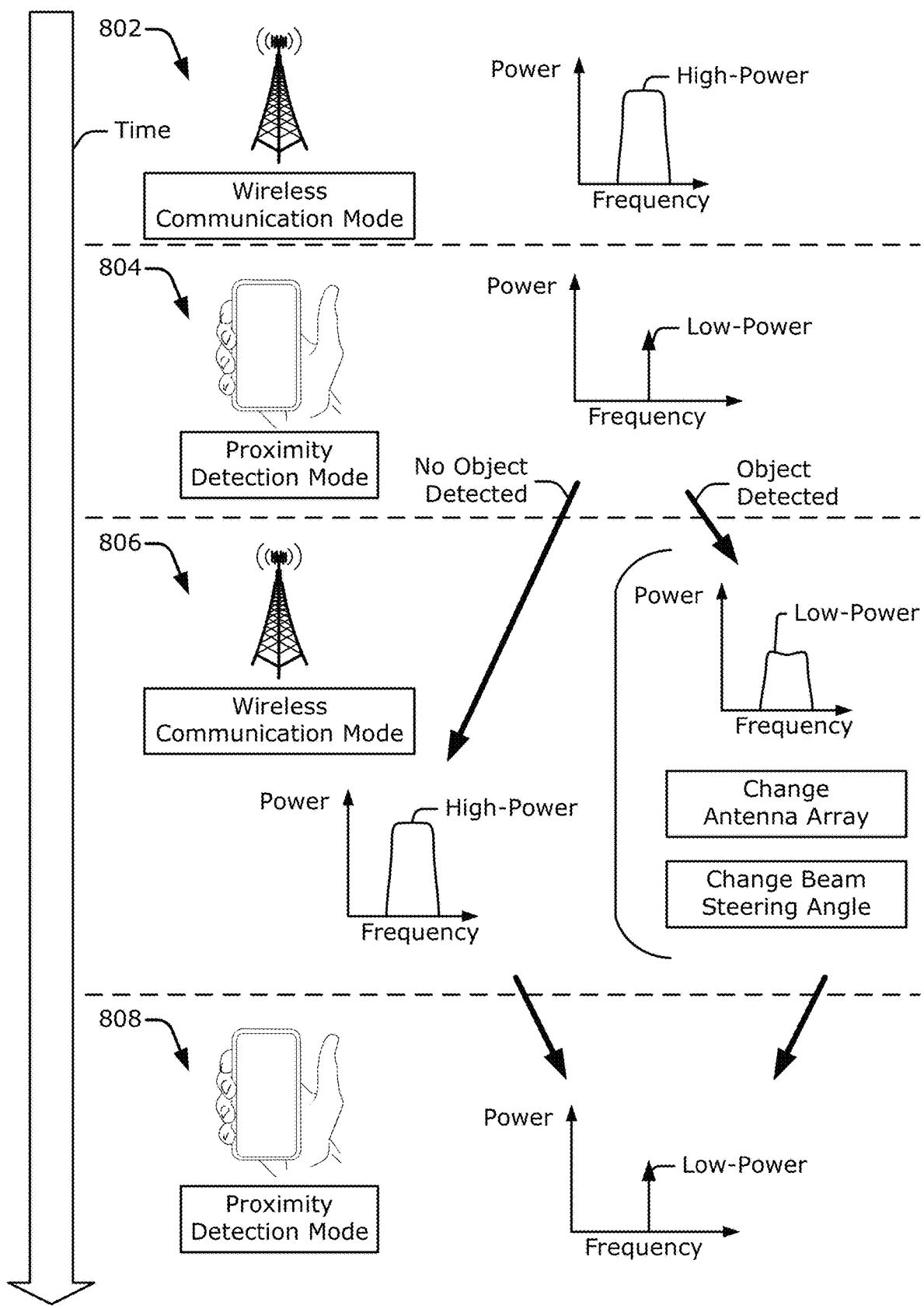
FIG. 8 illustrates an example sequence flow diagram for using proximity detection based on an electromagnetic field perturbation.

FIG. 8 illustrates an example sequence flow diagram for using proximity detection, with time elapsing in a downward direction. Examples of a wireless communication mode are shown at 802 and 806, and examples of a proximity detection mode are shown at 804 and 808. At 802, the wireless transceiver 120 transmits a high-power (e.g., normal) uplink signal 202 configured to provide sufficient range. After transmitting the uplink signal 202, the electromagnetic field 208 is generated via the wireless transceiver 120 at 804. As described above, the electromagnetic field 208 enables the computing device 102 to detect an object 206 and determine if the object 206 is near the computing device 102. In this case, the electromagnetic field 208 is represented by a low-power narrow-band signal. Based on the detection, the transmitter control module 524 can generate the transmission parameter 526. In some implementations, the transmission parameter 526 can be generated for a next uplink signal 202 to account for MPE compliance guidelines. For example, if the object 206 is detected, the transmitter control module 524 can decrease the transmit power for the next uplink signal 202. Alternatively, if the object 206 is not detected, the transmitter control module 524 can keep the transmit power unchanged. In other implementations, the transmission parameter 526 can specify transmission of another electromagnetic field 208 by specifying another antenna or a different transmit power level of a next electromagnetic field 208.

The proximity detection mode can also determine the range to the object 206, thereby enabling the transmission parameter 526 to comply with range-dependent guidelines. An example range-dependent guideline includes a maximum power density. Power density is proportional to transmit power and inversely proportional to range. Accordingly, for a same transmit power level, an object 206 at a closer range is exposed to a higher power density than another object 206 at a farther range. Therefore, a similar power density at the object 206 can be achieved by increasing the transmit power level if the object 206 is at a farther range and decreasing the transmit power level if the object 206 is at a closer range. In this way, the transmission parameter 526 can be adjusted to enable the power density at the object 206 for both the closer range and the farther range to be below the maximum power density. At the same time, because the range is known, the transmit power level can be increased to a level that facilitates wireless communications and comports with the compliance guideline.

At 806, the wireless transceiver 120 transmits the next uplink signal 202 using the transmission parameter 526 generated by the transmitter control module 524. In the depicted example, a high-power uplink signal 202 is transmitted if an object 206 is not detected. Alternatively, a low-power uplink signal 202 is transmitted if the object 206 is detected. The low-power can be, for example, between approximately five and twenty decibel-milliwatts (dBm) smaller than the high-power signal at 802. In addition to or instead of changing a power of the next uplink signal 202, the transmission parameter 526 can specify a different antenna within the computing device 102 or a different beam steering angle for transmitting the next uplink signal 202 (e.g., different than one or more antennas 124 or the beam steering angle used for transmitting the high-power signal at 802).

At 808, the wireless transceiver 120 generates another electromagnetic field 208 to attempt to detect the object 206. By scheduling multiple electromagnetic fields 208 over some time period, the wireless transceiver 120 can dynamically adjust the transmission parameter 526 based on a changing environment. In some cases, the electromagnetic field 208 can be generated and sensed between active data cycles that occur during wireless communication or during predetermined times set by the processor 122. By actively monitoring the environment, the wireless transceiver 120 can appropriately adjust the transmission parameter 526 in real-time to balance communication performance with compliance or radiation requirements. This monitoring also enables the transmission parameter 526 to be incrementally adjusted to account for movement by the object 206. The sequence described above can also be applied to other antennas. In some cases, the other antennas and the antennas 124 may generate electromagnetic fields 208 at a same time or at different times.

Figure 9:
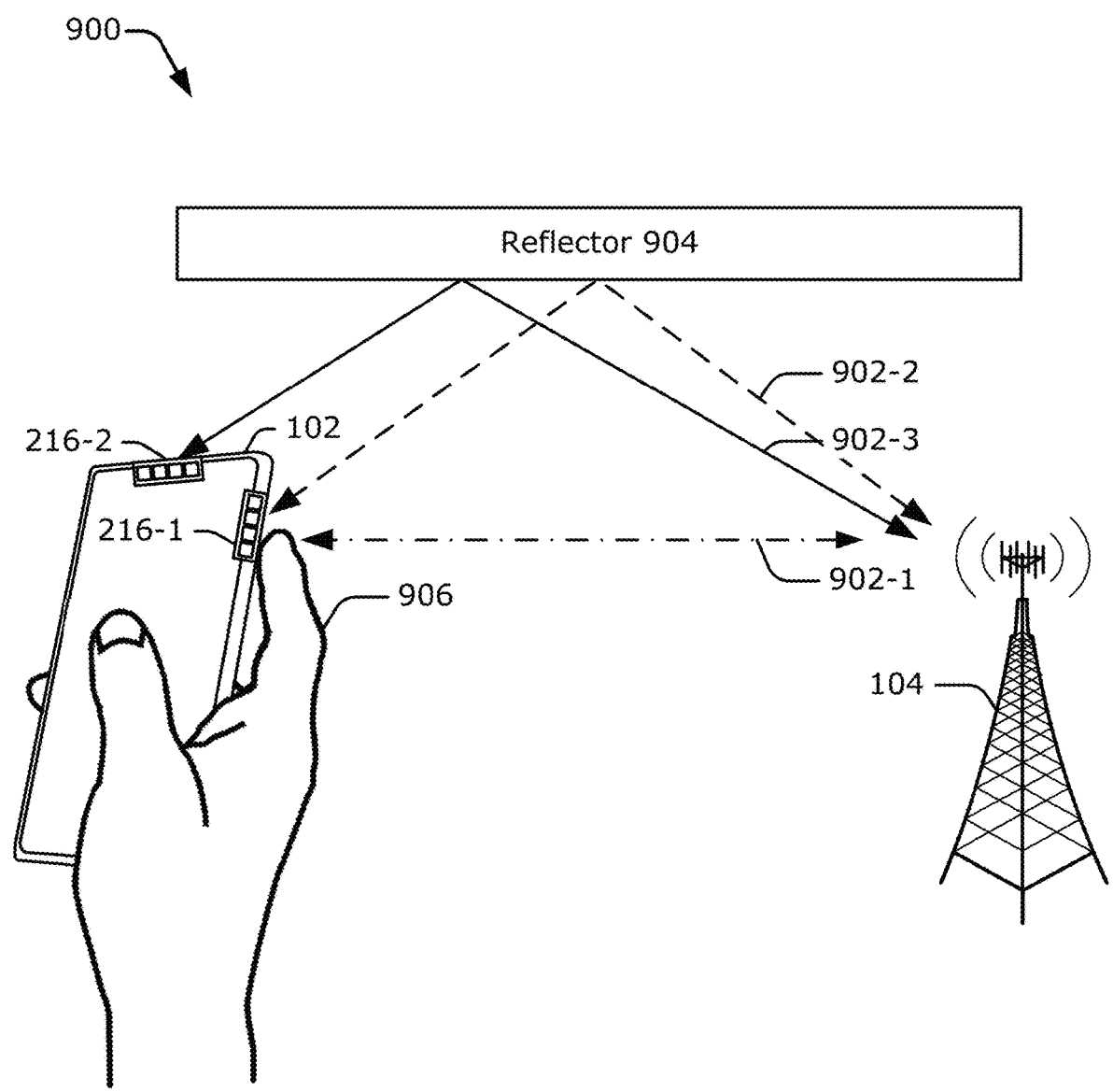
FIG. 9 illustrates example transmission parameter adjustments that are made in accordance with proximity detection based on an electromagnetic field perturbation.

FIG. 9 illustrates example transmission adjustments that are made in accordance with proximity detection based on an electromagnetic field perturbation. In FIG. 9, the computing device 102 includes antenna arrays 216-1 and 216-2. Through the antenna arrays 216-1 and 216-2, the computing device 102 can communicate with the base station 104 through multiple signal paths 902-1 to 902-3. A first signal path 902-1 represents a direct signal path between the antenna array 216-1 and the base station 104. A second signal path 902-2 represents an indirect signal path between the antenna array 216-1, a reflector 904, and the base station 104. A third signal path 902-3 represents an indirect signal path between the antenna array 216-2, the reflector 904, and the base station 104.

In the depicted environment, a finger 906 blocks the first signal path 902-1. Through proximity detection based on an electromagnetic field perturbation, the antenna array 216-1 can detect the finger 906. The transmitter control module 524 can generate transmission parameters 526 for the uplink signal 202 based on the detection. In some implementations, the transmission parameters 526 can ensure compliance or radiation requirements by specifying a different beam steering angle that enables the uplink signal 202 to be transmitted via the antenna array 216-1 using the second signal path 902-2 instead of the first signal path 902-1. The beam steering angle can decrease radiation exposure at the finger 906 by directing a main-lobe of the uplink signal 202 away from the finger 906. Additionally or alternatively, a transmit power for the uplink signal 202 can be reduced for the second signal path 902-2 or the first signal path 902-1. In other implementations, the transmission parameters 526 can specify a different antenna array 216 for transmitting the communication signal. For example, the antenna array 216-2 can be used instead of the antenna array 216-1 to transmit the uplink signal 202 using the third signal path 902-3. By adjusting the transmission parameters 526, the computing device 102 can maintain communication with the base station 104 while ensuring compliance.

FIG. 10 is a flow diagram illustrating an example process 1000 for proximity detection based on an electromagnetic field perturbation. The process 1000 is described in the form of a set of blocks 1002-1006 that specify operations that can be performed. However, operations are not necessarily limited to the order shown in FIG. 10 or described herein, for the operations may be implemented in alternative orders or in fully or partially overlapping manners. Operations represented by the illustrated blocks of the process 1000 may be performed by a computing device 102 (e.g., of FIG. 1, 2, or 9), a controller 318 (e.g., of FIG. 3), or a processor 122 (e.g., of FIG. 1, 5, or 6). More specifically, the operations of the process 1000 may be performed by the proximity detection module 520 or the transmitter control module 524 of FIG. 5 or 6.

At block 1002, an electromagnetic field is generated via at least one antenna. For example, the electromagnetic field 208 of FIG. 2 can be generated via the wireless transceiver 120 and at least one of the antennas 124. The electromagnetic field 208 can be generated with a specific frequency, polarization (e.g., horizontal polarization or vertical polarization), phase reference, angular direction (e.g., by performing beamforming techniques using multiple antenna elements 212 or via a directional antenna), and so forth.

At block 1004, energy from the electromagnetic field is received via at least two feed ports. The at least two feed ports are associated with one or more other antennas. For example, at least two portions of the electromagnetic field 208 can be respectively sensed by at least two antenna feed ports that are coupled to one or more other antennas 124, such as feed ports 302 and 304 of FIG. 3. The antenna feed ports can be associated with a same antenna or with different antennas. The at least two portions can include portions 306 and 308, which may represent different locations within the electromagnetic field 208 (e.g., via two physically separated antenna feed ports), different phases of the electromagnetic field 208 (e.g., via differential feed ports of a dipole antenna 312), different polarizations of the electromagnetic field 208 (e.g., via orthogonally-polarized feed ports of a patch antenna 314), different angular directions of the electromagnetic field 208 (e.g., via feed ports of a bowtie antenna 316), a combination thereof, and so forth.

At block 1006, a transmission parameter is adjusted based on the energy received via the at least two feed ports. The transmission parameter varies based on a range to an object that is present within the electromagnetic field. For example, the transmitter control module 524 can adjust the transmission parameter 526 based on the energy from the electromagnetic field 208 that is received via the feed ports 302 and 304. In general, the feed ports 302 and 304 can receive or sense a perturbation 210 that can be caused by the object 206 disturbing the electromagnetic field 208. The perturbation 210 can cause the energy of the electromagnetic field 208 to fluctuate at the one or more other antennas. Example transmission parameters 526 include a transmit power level, a beam steering angle, a transmission frequency, a wireless communication protocol, a selected antenna, and so forth. Thus, a transmit power level, for instance, can be increased for greater ranges to the object 206 and decreased for smaller ranges to the object 206. In this way, transmission of the uplink signal 202 can be adjusted to meet targeted guidelines.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
   an antenna array including at least two feed ports; and
   a wireless transceiver coupled to the antenna array, wherein the wireless transceiver is configured to:
   generate an electromagnetic field via the antenna array;
   receive energy from the electromagnetic field via the at least two feed ports of the antenna array; and
   adjust a transmission parameter based on the energy received via the at least two feed ports of the antenna array, wherein the transmission parameter varies based on a range to an object that is present within the electromagnetic field.

2. The apparatus of claim 1, wherein the wireless transceiver is configured to transmit an uplink signal or a proximity detection signal via the antenna array to generate the electromagnetic field.

3. The apparatus of claim 2, wherein the uplink signal comprises a Fifth Generation (5G) uplink signal.

4. The apparatus of claim 2, wherein the proximity detection signal comprises:
   an orthogonal frequency-division multiplexing (OFDM) signal;
   a frequency-modulated continuous-wave (FMCW) signal; or
   a continuous-wave signal having a constant frequency.

5. The apparatus of claim 1, wherein the wireless transceiver is further configured to transmit an uplink signal using the transmission parameter.

6. The apparatus of claim 1, wherein the transmission parameter comprises at least one of the following:
   a power level;
   a beam steering angle;
   a frequency;
   a selected antenna; or
   a communication protocol.

7. The apparatus of claim 1, wherein:
the at least two feed ports include a first feed port and a second feed port;
the antenna array includes a first antenna element and a second antenna element, the second antenna element including the first feed port and the second feed port; and
the wireless transceiver is configured to:
   generate the electromagnetic field via the first antenna element;
   receive a first portion of the energy from the electromagnetic field via the first feed port; and
   receive a second portion of the energy from the electromagnetic field via the second feed port.

8. The apparatus of claim 7, wherein:
the second antenna element comprises a patch antenna;
the first feed port of the patch antenna comprises a horizontally-polarized feed port;
the second feed port of the patch antenna comprises a vertically-polarized feed port; and
the first portion and the second portion respectively comprise a horizontally-polarized portion and a vertically-polarized portion.

9. The apparatus of claim 8, wherein:
the first antenna element comprises another patch antenna, the other patch antenna including another horizontally-polarized feed port and another vertically-polarized feed port; and
the wireless transceiver is further configured to generate at least one of the following:
   a horizontally-polarized electromagnetic field via the other horizontally-polarized feed port of the first antenna element; or
   a vertically-polarized electromagnetic field via the other vertically-polarized feed port of the first antenna element.

10. The apparatus of claim 7, wherein:
the second antenna element comprises a dipole antenna;
the first feed port and the second feed port of the dipole antenna together comprise a pair of differential feed ports; and
the first portion and the second portion each comprise differential portions of the electromagnetic field.

11. The apparatus of claim 7, wherein:
the second antenna element comprises a bowtie antenna;
the first feed port and the second feed port together comprise a pair of directional feed ports;
the first portion and the second portion each comprise a different angular direction of the electromagnetic field; and
the second antenna element is adjacent to the first antenna element.

12. The apparatus of claim 1, wherein:
the at least two feed ports include a first feed port and a second feed port;
the antenna array includes a first antenna element, a second antenna element, and a third antenna element, the second antenna element including the first feed port and the third antenna element including the second feed port; and
the wireless transceiver is configured to:
   generate the electromagnetic field via the first antenna element;
   receive a first portion of the energy from the electromagnetic field via the first feed port; and
   receive a second portion of the energy from the electromagnetic field via the second feed port.

13. The apparatus of claim 1, wherein:
the at least two feed ports include a first feed port, a second feed port, a third feed port, and a fourth feed port;
the antenna array includes a first antenna element, a second antenna element, and a third antenna element, the second antenna element including the first feed port and the second feed port, the third antenna element including the third feed port and the fourth feed port; and
the wireless transceiver is configured to:
   generate the electromagnetic field via the first antenna element;
   receive a first portion and a second portion of the energy from the electromagnetic field via the first feed port and the second feed port, respectively; and
   receive a third portion and a fourth portion of the energy from the electromagnetic field via the third feed port and the fourth feed port, respectively.

14. An apparatus comprising:
an antenna array including at least two feed ports;
transmission means for generating an electromagnetic field via the antenna array;
reception means for receiving energy from the electromagnetic field via the at least two feed ports of the antenna array; and
adjustment means for adjusting a transmission parameter based on the energy received via the at least two feed ports of the antenna array, wherein the transmission parameter varies based on a range to an object that is present within the electromagnetic field.

15. The apparatus of claim 14, wherein the transmission means is configured to transmit at least one of the following signals to generate the electromagnetic field:
an uplink signal;
a Fifth Generation (5G) uplink signal;
an orthogonal frequency-division multiplexing (OFDM) signal;
a frequency-modulated continuous-wave (FMCW) signal; or
a continuous-wave signal having a constant frequency.

16. The apparatus of claim 14, wherein the transmission parameter comprises at least one of the following:
a power level;
a beam steering angle;
a frequency;
a selected antenna; or
a communication protocol.

17. The apparatus of claim 14, wherein:
the at least two feed ports include a first feed port and a second feed port;
the antenna array includes a first antenna element and a second antenna element, the second antenna element including the first feed port and the second feed port;
the transmission means is configured to generate the electromagnetic field via the first antenna element; and
the reception means is configured to:
   receive a first portion of the energy from the electromagnetic field via the first feed port; and
   receive a second portion of the energy from the electromagnetic field via the second feed port.

18. The apparatus of claim 17, wherein:
the second antenna element comprises a patch antenna;
the first feed port of the patch antenna comprises a horizontally-polarized feed port;
the second feed port of the patch antenna comprises a vertically-polarized feed port; and the first portion and the second portion respectively comprise a horizontally-polarized portion and a vertically-polarized portion.

19. The apparatus of claim 18, wherein:
the first antenna element comprises another patch antenna, the other patch antenna including another horizontally-polarized feed port and another vertically-polarized feed port; and
the transmission means is configured to generate at least one of the following:
a horizontally-polarized electromagnetic field via the other horizontally-polarized feed port of the first antenna element; or
a vertically-polarized electromagnetic field via the other vertically-polarized feed port of the first antenna element.

20. The apparatus of claim 17, wherein:
the second antenna element comprises a dipole antenna;
the first feed port and the second feed port of the dipole antenna together comprise a pair of differential feed ports; and
the first portion and the second portion each comprise a differential portion of the electromagnetic field.

21. The apparatus of claim 17, wherein:
the second antenna element comprises a bowtie antenna; and
the first portion and the second portion each comprise a different angular direction of the electromagnetic field.

22. A method for proximity detection based on an electromagnetic field perturbation, the method comprising:
generating an electromagnetic field via at least one antenna of an antenna array;
receiving energy from the electromagnetic field via at least two feed ports of the antenna array, the at least two feed ports being associated with one or more other antennas of the antenna array; and
adjusting a transmission parameter based on the energy received via the at least two feed ports of the antenna array, the transmission parameter varying based on a range to an object that is present within the electromagnetic field.

23. The method of claim 22, wherein the generating of the electromagnetic field comprises transmitting at least one of the following signals:
an uplink signal;
a Fifth Generation (5G) uplink signal;
an orthogonal frequency-division multiplexing (OFDM) signal;
a frequency-modulated continuous-wave (FMCW) signal; or
a continuous-wave signal having a constant frequency.

24. The method of claim 22, wherein the transmission parameter comprises at least one of the following:
a power level;
a beam steering angle;
a frequency;
a selected antenna; or
a communication protocol.

25. The method of claim 22, wherein the at least one antenna comprises at least one of the following:
a patch antenna including a horizontally-polarized feed port and a vertically-polarized feed port;
a dipole antenna including differential feed ports; or
a bowtie antenna including directional feed ports.

26. The method of claim 25, wherein the generating of the electromagnetic field comprises at least one of the following:
generating, based on the at least one antenna comprising the patch antenna, the electromagnetic field via at least one of the horizontally-polarized feed port or the vertically-polarized feed port;
generating, based on the at least one antenna comprising the dipole antenna, the electromagnetic field via at least one of the differential feed ports; or
generating, based on the at least one antenna comprising the bowtie antenna, the electromagnetic field via at least one of the directional feed ports.

27. The method of claim 22, wherein:
the one or more other antennas comprise a first antenna; and
the first antenna comprises at least one of the following:
a patch antenna including a horizontally-polarized feed port and a vertically-polarized feed port;
a dipole antenna including differential feed ports; or
a bowtie antenna including directional feed ports.

28. The method of claim 27, wherein:
the at least two feed ports are associated with the first antenna; and
the receiving of the energy via the at least two feed ports comprises at least one of the following:
receiving, based on the first antenna comprising the patch antenna, the energy via the horizontally-polarized feed port and the vertically-polarized feed port;
receiving, based on the first antenna comprising the dipole antenna, the energy via the differential feed ports; or
receiving, based on the first antenna comprising the bowtie antenna, the energy via the directional feed ports.

29. The method of claim 27, wherein:
the one or more other antennas comprise a second antenna;
the at least two feed ports include a first feed port and a second feed port, the first feed port being associated with the first antenna, and the second feed port being associated with the second antenna; and
the receiving of the energy from the electromagnetic field comprises:
receiving a first portion of the energy via the first antenna; and
receiving a second portion of the energy via the second antenna.

30. The apparatus of claim 1, wherein the wireless transceiver is further configured to determine that the object is present within a detectable range of the wireless transceiver based on the energy received via the at least two feed ports of the antenna array, and wherein a duration for which the electromagnetic field is generated via the antenna array is based on the detectable range of the wireless transceiver.

* * * * *